No. 753,329. PATENTED MAR. 1, 1904.
J. B. TATE.
FLEXIBLE STAY BOLT.
APPLICATION FILED MAR. 4, 1903.
NO MODEL.
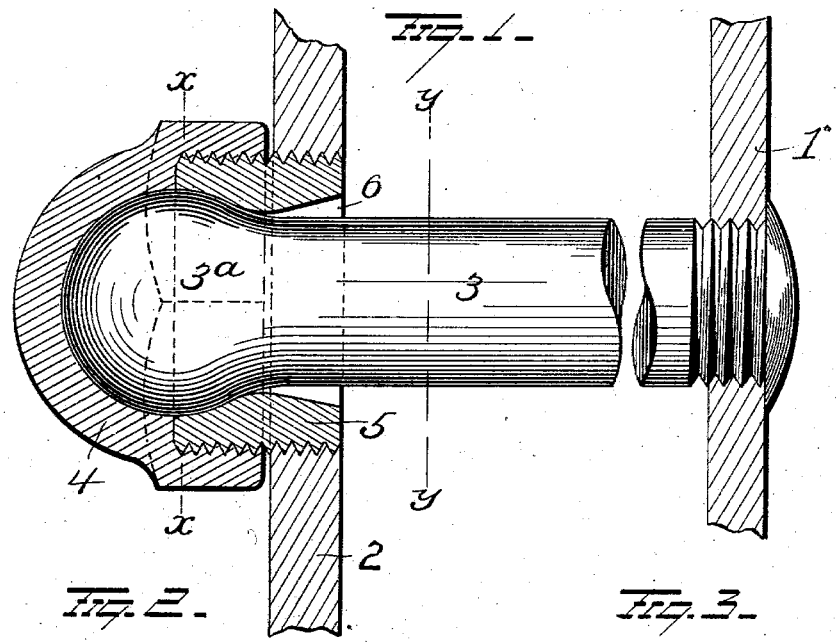
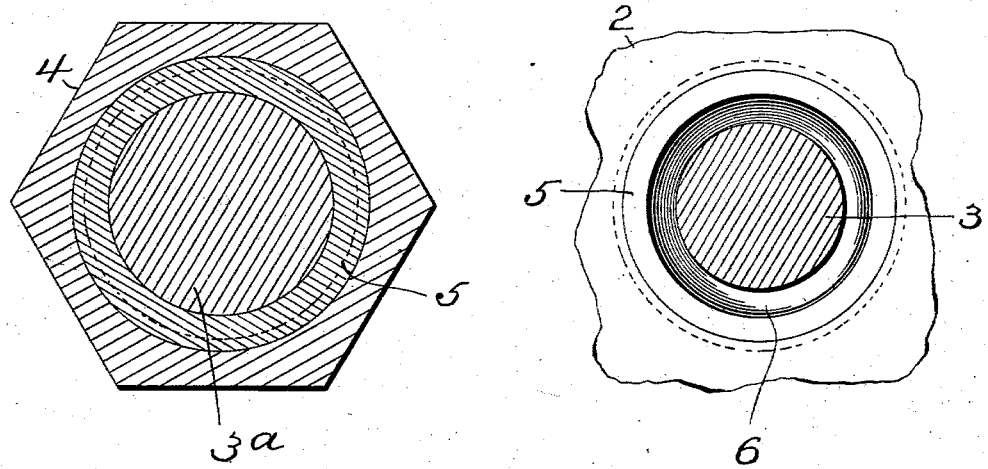
WITNESSES
E. J. Nottingham
S. G. Nottingham
INVENTOR
John B. Tate
By H. A. Seymour,
Attorney No. 753,329. Patented March 1, 1904.

UNITED STATES PATENT OFFICE.

JOHN BRUCE TATE, OF ALTOONA, PENNSYLVANIA.

FLEXIBLE STAY-BOLT.

SPECIFICATION forming part of Letters Patent No. 753,329, dated March 1, 1904.

Application filed March 4, 1903. Serial No. 146,192. (No model.)

*To all whom it may concern:*

Be it known that I, JOHN BRUCE TATE, a resident of Altoona, in the county of Blair and State of Pennsylvania, have invented certain new and useful Improvements in Flexible Stay-Bolts; and I do hereby declare the following to be a full, clear, and exact description of the invention, such as will enable others skilled in the art to which it appertains to make and use the same.

My invention relates to an improvement in stay-bolts, and more particularly to flexible stay-bolts for staying the flat surfaces of locomotives and other steam-boilers in which screw stay-bolts are employed for staying the walls of fire-boxes and the outer shell, the object of the invention being to provide improvements of this character which will absolutely prevent leakage and yet insure flexibility to compensate for varying contraction and expansion of the metal.

With these objects in view the invention consists in certain novel features of construction and combinations and arrangements of parts, as will be more fully hereinafter described, and pointed out in the claims.

In the accompanying drawings, Figure 1 is a view in section illustrating my improvements; and Figs. 2 and 3 are views in section on the lines $x$ $x$ and $y$ $y$, respectively, of Fig. 1.

1 represents the fire-box plate, 2 the outside or shell plate, and 3 my improved bolt. The plate 2 is made with a screw-threaded opening, into which an externally-screw-threaded bushing 5 is located, and this bushing 5 has screwed onto its protruding end a cap-nut 4, which coöperates with the bushing to form a spherical socket to receive and snugly fit the spherical head $3^a$ of bolt 3. The other or threaded end of bolt 3 is screwed into plate 1, and the bushing 5 has a flaring mouth 6 on its inner portion to permit of pivotal movement of the bolt in any direction. The line or contour of this flaring mouth 6 curves into the half-spherical socket of the bushing, and the bolt at the juncture of its spherical head $3^a$ is also curved in direction opposite to that of the sphere to permit the head to turn in the socket and not be interfered with by the bolt proper. In other words, the spherical head of the bolt does not abruptly end with the straight line of the bolt, but curves in the direction opposite to that of the curvature of the sphere, and the bushing being curved in like manner permits of pivotal movement of the bolt to a considerable degree.

My improvements insure a practically water and steam tight joint by the perfect fitting of the bolt-head in the socket, which eliminates the possibility of sand or grit finding its way into the bearing. Should sediment enter the mouth of the bushing, its flaring shape will enable the steam-pressure to force it out. By shaping the bolt, head, bushing, and cap as above explained pivotal movement of the bolt in any direction is assured to compensate for varying contraction and expansion of the plates, at the same time maintaining a perfect connection.

Slight changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. A stay-bolt structure comprising a body portion threaded at one end, and a head at the other end of said body portion, the outer portion of said head being partly spherical and the inner portion thereof adjacent to and terminating at the body of the bolt having a curved contour reverse to that of partly-spherical portion of said head.

2. A stay-bolt structure comprising a body portion threaded at one end, a head at the other end of said body portion, the outer portion of said head being partly spherical and the inner portion having a curvature reverse to that of the outer portion, said reversely-curved inner portion terminating at the juncture of the head with the body portion of the bolt, and sectional coupling means constructed to receive said head and secure the same to a boiler-plate.

3. In a device of the character described, the combination with an outer and inner sheet, of an exteriorly-threaded bushing open at both ends and screwed into the outer sheet and provided with a half-spherical opening, and a flaring mouth in the inner or water side, a cap having a curved seat, secured on said bushing, and a spherically-headed bolt to fit said bushing and the seat in the cap, substantially as described.

4. The combination with the outer and inner sheets or plates of a boiler, a threaded bushing screwed into the outer plate and having a semispherical socket in its outer portion and a flaring mouth in its inner portion, a bolt screwed into the inner plate and having a spherical head at its outer end to fit the socket in the bushing, and a recessed cap screwed onto the bushing and having a half-spherical socket to coöperate with the socket of the bushing and form a complete spherical socket for the bolt-head.

In testimony whereof I have signed this specification in the presence of two subscribing witnesses.

JOHN BRUCE TATE.

Witnesses:
J. N. STEPHENS,
MARRY RUSSELL.